(12) United States Patent
Hanks et al.

(10) Patent No.: US 9,598,645 B2
(45) Date of Patent: Mar. 21, 2017

(54) COPROCESSING OF BIOFEEDS WITH GROUP VI METAL CATALYSTS

(71) Applicant: ExxonMobil Research and Engineering Company, Annandale, NJ (US)

(72) Inventors: Patrick L. Hanks, Bridgewater, NJ (US); Bradley R. Fingland, Annandale, NJ (US); Stuart L. Soled, Pittstown, NJ (US); Sabato Miseo, Pittstown, NJ (US)

(73) Assignee: EXXONMOBIL RESEARCH AND ENGINEERING COMPANY, Annandale, NJ (US)

( * ) Notice: Subject to any disclaimer, the term of this patent is extended or adjusted under 35 U.S.C. 154(b) by 842 days.

(21) Appl. No.: 13/851,247

(22) Filed: Mar. 27, 2013

(65) Prior Publication Data

US 2013/0310618 A1 Nov. 21, 2013

Related U.S. Application Data

(60) Provisional application No. 61/617,984, filed on Mar. 30, 2012.

(51) Int. Cl.
  *C10G 3/00* (2006.01)
  *B01J 23/30* (2006.01)
  (Continued)

(52) U.S. Cl.
  CPC ............... *C10G 3/50* (2013.01); *B01J 23/30* (2013.01); *B01J 23/882* (2013.01); *B01J 23/883* (2013.01); *B01J 23/888* (2013.01); *B01J 23/8872* (2013.01); *B01J 23/8873* (2013.01); *C10G 3/46* (2013.01); *C10G 45/04* (2013.01); *C10G 65/04* (2013.01); *B01J 37/0201* (2013.01); *B01J 37/0238* (2013.01); *C10G 2300/202* (2013.01); *Y02P 30/20* (2015.11)

(58) Field of Classification Search
  CPC ............. C10G 3/46; C10G 3/47; C10G 45/00
  USPC .................................................. 585/324, 639
  See application file for complete search history.

(56) References Cited

U.S. PATENT DOCUMENTS 5,616,531 A 4/1997 Feldhauser et al.
6,156,695 A 12/2000 Soled et al.
(Continued)

FOREIGN PATENT DOCUMENTS

FR    EP 2428548 A1 * 3/2012 ............... C10G 3/42
WO    2010088486 A1    8/2010
(Continued)

OTHER PUBLICATIONS

The International Search Report and Written Opinion of PCT/US2013/034206 dated May 28, 2013.
(Continued)

*Primary Examiner* — In Suk Bullock
*Assistant Examiner* — Youngsul Jeong
(74) *Attorney, Agent, or Firm* — David M. Weisberg; Chad A. Guice; Bruce M. Bordelon (57) ABSTRACT

Feedstocks containing biocomponent materials are coprocessed with mineral feeds using a Group VI metal catalyst prior to hydrodesulfurization of the feedstocks. The Group VI metal catalyst is optionally a physically promoted Group VI metal catalyst.

20 Claims, 8 Drawing Sheets

(51) Int. Cl.
*C10G 45/04* (2006.01)
*C10G 65/04* (2006.01)
*B01J 23/882* (2006.01)
*B01J 23/883* (2006.01)
*B01J 23/887* (2006.01)
*B01J 23/888* (2006.01)
*B01J 37/02* (2006.01)

(56) References Cited

U.S. PATENT DOCUMENTS

| | | | |
|---|---|---|---|
| 7,491,858 B2 | 2/2009 | Murzin et al. | |
| 7,795,484 B2 | 9/2010 | Koivusalmi | |
| 7,888,542 B2 | 2/2011 | Koivusalmi et al. | |
| 2008/0161614 A1 | 7/2008 | Bertoncini et al. | |
| 2008/0308457 A1* | 12/2008 | Dindi | B01J 23/755 |
| | | | 208/135 |
| 2009/0163744 A1 | 6/2009 | Abhari et al. | |
| 2009/0283442 A1* | 11/2009 | McCall | C10G 3/46 |
| | | | 208/15 |
| 2009/0326285 A1 | 12/2009 | Bauer et al. | |
| 2010/0163458 A1 | 7/2010 | Daudin et al. | |
| 2010/0175308 A1 | 7/2010 | Cole et al. | |
| 2010/0176026 A1 | 7/2010 | Cole et al. | |
| 2010/0213103 A1 | 8/2010 | Patron et al. | |
| 2010/0270207 A1 | 10/2010 | Gomes et al. | |
| 2011/0005976 A1 | 1/2011 | Rispoli et al. | |
| 2011/0054230 A1 | 3/2011 | Cole et al. | |
| 2011/0094149 A1 | 4/2011 | Weiss et al. | |
| 2011/0132803 A1 | 6/2011 | Umansky et al. | |
| 2011/0166396 A1 | 7/2011 | Egeberg et al. | |
| 2011/0294656 A1 | 12/2011 | Soled et al. | |
| 2011/0294657 A1 | 12/2011 | Soled et al. | |
| 2012/0216450 A1* | 8/2012 | Dupassieux | B01J 23/88 |
| | | | 44/307 |

FOREIGN PATENT DOCUMENTS

| | | | | |
|---|---|---|---|---|
| WO | 2011012439 A1 | 2/2011 | | |
| WO | 2011027044 A1 | 3/2011 | | |
| WO | 2011030009 A1 | 3/2011 | | |
| WO | WO 2011030009 A1 * | 3/2011 | | B01J 23/88 |

OTHER PUBLICATIONS

The International Search Report and Written Opinion of PCTUS2013/034209 dated May 28, 2013.

Johnson, Marvin F.L., "Estimation of the Zeolite Content of a Catalyst from Nitrogen Adsorption Isotherms", Journal of Catalysts, 1978, pp. 425-431, vol. 52.

* cited by examiner

COPROCESSING OF BIOFEEDS WITH GROUP VI METAL CATALYSTS

CROSS-REFERENCE TO RELATED APPLICATIONS

This application claims priority to U.S. Provisional Application Ser. No. 61/617,984 filed Mar. 30, 2012, herein incorporated by reference in its entirety.

FIELD

This invention relates to methods for coprocessing of mineral feeds with feeds derived from biological sources.

BACKGROUND

Regulations related to renewable fuels provide an example of how product requirements can change over time. During the next decade, the United States, Canada, and the European Union have increased and/or are likely to increase the required amount of product from renewable sources that is contained in transportation fuels. Based on such regulatory requirements, fuels from vegetable, animal, or algae sources such as "biodiesel" will become increasingly important as a refinery product. As a result, methods are needed that will allow existing refinery equipment to produce suitable transportation fuels that incorporate increasing amounts of renewable components.

Unfortunately, the differences in chemical composition between renewable carbon sources and mineral sources poses some difficulties for refinery processing. For example, typical biologically-derived sources for fuels have oxygen contents of 1 wt % or more, possibly as much as 10 wt % or more. Conventional hydroprocessing methods can remove oxygen from a feedstock, but the by-products from deoxygenation can lead to catalyst poisoning and/or contaminant build-up in a reaction system.

U.S. Patent Application Publication 2010/0163458 describes a method for converting effluents of renewable origin into fuel. The method includes the use of a supported catalyst containing $MoS_2$ and a dopant, such as phosphorus, carbon, or silicon. The method is described as favoring removal of oxygen by hydrodeoxygenation as opposed decarboxylation or decarboxylation.

U.S. Patent Application Publication 2011/0166396 describes a hydrodeoxygenation catalyst and a method for using such a catalyst. The catalyst is a supported catalyst containing Mo, with a support that includes a bimodal pore distribution. Additionally, at least 2 volume percent of the pores in the support are greater than 50 nm in diameter. The Mo catalyst with the specified pore distribution is used to perform hydrodeoxygenation on feeds containing up to 35 vol. % of renewable organic material.

SUMMARY OF EMBODIMENTS OF THE INVENTION

In one aspect, a method is provided for coprocessing of a biocomponent feedstock. The method includes exposing a feedstock containing a mineral fraction and a biocomponent fraction to a supported Group VI metal catalyst in the presence of hydrogen under effective deoxygenation conditions for forming a deoxygenated effluent, the Group VI metal catalyst comprising tungsten, physically promoted tungsten, or physically promoted molybdenum on a support, the feedstock comprising 25 wt % or less of the biocomponent fraction; and exposing the deoxygenated feed to a hydroprocessing catalyst under effective hydroprocessing conditions to produce an effluent having a sulfur content of about 100 wppm or less.

DETAILED DESCRIPTION OF THE PREFERRED EMBODIMENTS

In various aspects, methods are provided for co-processing of biocomponent feeds using Group VI metal catalysts as part of a stacked catalyst bed arrangement. The stacked beds can include one or more at least partial catalyst beds of a tungsten catalyst or a physically promoted catalyst such as a catalyst containing zinc or magnesium as a physical promoter for tungsten or molybdenum. One or more subsequent beds can include a hydrotreating catalyst, such as a CoMo or NiMo hydrotreating catalyst.

One way to adapt existing reactors to meet changing requirements can be to co-process multiple feeds within a reactor. However, co-processing of multiple feeds in a hydroprocessing reactor can pose a variety of challenges. For example, feedstocks based on biological sources, such as feeds containing vegetable, animal, or algae oils or fats, can contain a substantial amount of oxygen. The oxygen contents of the biological source feedstocks can lead to production of undesirable amounts of CO and/or $CO_2$. The resulting CO and/or $CO_2$ generated from hydroprocessing of the biological source feedstock can cause poisoning of the hydroprocessing catalyst. The product gases generated from such hydroprocessing may also have an increased ability to corrode hydroprocessing equipment. Still another concern is that removal of oxygen from a biocomponent feed is an exothermic reaction, potentially leading to difficulties in maintaining temperature control in a reactor. Additionally, removal of oxygen from a biocomponent feed typically requires a hydrogen source. Many refineries already have limitations on available hydrogen, and having yet another process that consumes hydrogen further limits the choices available to such a refinery.

It has been discovered that one option for addressing at least some of the above problems is to use a supported catalyst that includes a Group VI metal as an initial hydroprocessing bed and/or stage for a feed including both mineral-derived feedstock and biocomponent-derived feedstock. A suitable metal for a supported Group VI metal catalyst is tungsten. Optionally, such a Group VI metal catalyst can also include a physical promoter metal, such as magnesium or zinc. This results in a catalyst comprising, for example, zinc and/or magnesium as a physical promoter for molybdenum or tungsten. In some aspects, a feed including a mixture of mineral-derived feedstock and biocomponent-derived feedstock can be exposed to the Group VI metal catalyst under low pressure conditions, such as a hydrogen partial pressure of 400 psig (2.75 MPag) or less.

A Group VI metal catalyst can be incorporated into a reaction system as part of multi-bed and/or multi-stage process for coprocessing of a feedstock. One or more initial beds or stages can include a supported Group VI metal catalyst. The feed is initially exposed to this catalyst under effective conditions for at least a portion of the oxygen from the feed. The feed with reduced oxygen content can then be exposed to a conventional hydrotreatment catalyst under effective hydrotreatment conditions for removal of sulfur and nitrogen, as well as any remaining oxygen.

Treating a feed containing a biocomponent portion with a Group VI metal catalyst prior to hydrotreatment of the feed can provide a variety of advantages. One potential advantage is reduction of the exotherm across the catalyst bed for the hydrotreating catalyst. Deoxygenation reactions are strongly exothermic, so combining deoxygenation of a biocomponent feed with a conventional hydrodesulfurization process on a sulfur-containing mineral feed could lead to an excessive temperature increase across a catalyst bed. Because the Group VI metal catalyst is selective for performing deoxygenation relative to desulfurization, the temperature increase across the catalyst bed for the Group VI metal catalyst will typically be more manageable. Another potential advantage is an improved overall catalyst activity for the combination of the Group VI metal catalyst and the hydrotreating catalyst, relative to using a similar size bed of only hydrotreating catalyst. Deoxygenation reactions typically produce both water and carbon oxides as residual products. The combination of water and carbon oxides can lead to deactivation of some types of hydrotreating catalysts. In some reaction system configurations, one or more initial beds of a Group VI metal catalyst can be used to perform deoxygenation prior to exposing a feedstock to a hydrotreating catalyst. The water and carbon oxide contaminants generated during deoxygenation can be separated out prior to exposing the deoxygenated feed to the hydrotreating catalyst, thus reducing or avoiding any deactivation of the hydrotreating catalyst.

Feedstocks

In the discussion below, a biocomponent feed or feedstock refers to a hydrocarbon feedstock derived from a biological raw material component, such as vegetable fats/oils or animal fats/oils, fish oils, pyrolysis oils, and algae lipids/oils, as well as components of such materials, and in some embodiments can specifically include one or more types of lipid compounds. Lipid compounds are typically biological compounds that are insoluble in water, but soluble in nonpolar (or fat) solvents. Non-limiting examples of such solvents include alcohols, ethers, chloroform, alkyl acetates, benzene, and combinations thereof.

Major classes of lipids include, but are not necessarily limited to, fatty acids, glycerol-derived lipids (including fats, oils and phospholipids), sphingosine-derived lipids (including ceramides, cerebrosides, gangliosides, and sphingomyelins), steroids and their derivatives, terpenes and their derivatives, fat-soluble vitamins, certain aromatic compounds, and long-chain alcohols and waxes.

In living organisms, lipids generally serve as the basis for cell membranes and as a form of fuel storage. Lipids can also be found conjugated with proteins or carbohydrates, such as in the form of lipoproteins and lipopolysaccharides.

Examples of vegetable oils that can be used in accordance with this invention include, but are not limited to rapeseed (canola) oil, soybean oil, coconut oil, sunflower oil, palm oil, palm kernel oil, peanut oil, linseed oil, tall oil, corn oil, castor oil, jatropha oil, jojoba oil, olive oil, flaxseed oil, camelina oil, safflower oil, babassu oil, tallow oil and rice bran oil.

Vegetable oils as referred to herein can also include processed vegetable oil material. Non-limiting examples of processed vegetable oil material include fatty acids and fatty acid alkyl esters. Alkyl esters typically include $C_1$-$C_5$ alkyl esters. One or more of methyl, ethyl, and propyl esters are preferred.

Examples of animal fats that can be used in accordance with the invention include, but are not limited to, beef fat (tallow), hog fat (lard), turkey fat, fish fat/oil, and chicken fat. The animal fats can be obtained from any suitable source including restaurants and meat production facilities.

Animal fats as referred to herein also include processed animal fat material. Non-limiting examples of processed animal fat material include fatty acids and fatty acid alkyl esters. Alkyl esters typically include $C_1$-$C_5$ alkyl esters. One or more of ethyl, and propyl esters are preferred.

Algae oils or lipids can typically be contained in algae in the form of membrane components, storage products, and/or metabolites. Certain algal strains, particularly microalgae such as diatoms and cyanobacteria, can contain proportionally high levels of lipids. Algal sources for the algae oils can contain varying amounts, e.g., from 2 wt % to 40 wt % of lipids, based on total weight of the biomass itself.

Algal sources for algae oils can include, but are not limited to, unicellular and multicellular algae. Examples of such algae can include a rhodophyte, chlorophyte, heterokontophyte, tribophyte, glaucophyte, chlorarachniophyte, euglenoid, haptophyte, cryptomonad, dinoflagellum, phytoplankton, and the like, and combinations thereof. In one embodiment, algae can be of the classes Chlorophyceae and/or Haptophyta. Specific species can include, but are not limited to, *Neochloris oleoabundans, Scenedesmus dimorphus, Euglena Phaeodactylum tricornutum, Pleurochrysis carterae, Prymnesium parvum, Tetraselmis chui,* and *Chlamydomonas reinhardtii.* Additional or alternate algal sources can include one or more microalgae of the *Achnanthes, Amphiprora, Amphora, Ankistrodesmus, Asteromonas, Boekelovia, Borodinella, Botryococcus, Bracteococcus, Chaetoceros, Carteria, Chlamydomonas, Chlorococcum, Chlorogonium, Chlorella, Chroomonas, Chrysosphaera, Cricosphaera, Crypthecodinium, Cryptomonas, Cyclotella, Dunaliella, Ellipsoidon, Emiliania, Eremosphaera, Ernodesmius, Euglena, Franceia, Fragilaria, Gloeothamnion, Haematococcus, Halocafeteria, Hymenomonas, Isochrysis, Lepocinclis, Micractinium, Monoraphidium, Nannochloris, Nannochloropsis, Navicula, Neochloris, Nephrochloris, Nephroselmis, Nitzschia, Ochromonas, Oedogonium, Oocystis, Ostreococcus, Pavlova, Parachlorella, Pascheria, Phaeodactylum, Phagus, Platymonas, Pleurochrysis, Pleurococcus, Prototheca, Pseudochlorella, Pyramimonas, Pyrobotrys, Scenedesmus, Skeletonema, Spyrogyra, Stichococcus, Tetraselmis, Thalassiosira, Viridiella,* and *Volvox* species, and/or one or more cyanobacteria of the *Agmenellum, Anabaena, Anabaenopsis, Anacystis, Aphanizomenon, Arthrospira, Asterocapsa, Borzia, Calothrix, Chamaesiphon, Chlorogloeopsis, Chroococcidiopsis, Chroococcus, Crinalium, Cyanobacterium, Cyanobium, Cyanocystis, Cyanospira, Cyanothece, cylindrospermopsis, Cylindrospermum, Dactylococcopsis, Dermocarpella, Fischerella, Fremyella, Geitleria, Geitlerinema, Gloeobacter, Gloeocapsa, Gloeothece, Halospirulina, Iyengariella, Leptolyngbya, Limnothrix, Lyngbya, Microcoleus, Microcystis, Myxosarcina, Nodularia, Nostoc, Nostochopsis, Oscillato-*

*ria, Phormidium, Planktothrix, Pleurocapsa, Prochlorococcus, Prochloron, Prochlorothrix, Pseudanabaena, Rivularia, Schizothrix, Scytonema, Spirulina, Stanieria, Starria, Stigonema, Symploca, Synechococcus, Synechocystis, Tolypothrix, Trichodesmium, Tychonema* and *Xenococcus* species.

Other biocomponent feeds usable in the present invention can include any of those which comprise primarily triglycerides and free fatty acids (FFAs). The triglycerides and FFAs typically contain aliphatic hydrocarbon chains in their structure having from 8 to 36 carbons, preferably from 10 to 26 carbons, for example from 14 to 22 carbons. Types of triglycerides can be determined according to their fatty acid constituents. The fatty acid constituents can be readily determined using Gas Chromatography (GC) analysis. This analysis involves extracting the fat or oil, saponifying (hydrolyzing) the fat or oil, preparing an alkyl (e.g., methyl) ester of the saponified fat or oil, and determining the type of (methyl) ester using GC analysis. In one embodiment, a majority (i.e., greater than 50%) of the tri glyceride present in the lipid material can be comprised of $C_{10}$ to $C_{26}$ fatty acid constituents, based on total triglyceride present in the lipid material. Further, a triglyceride is a molecule having a structure identical to the reaction product of glycerol and three fatty acids. Thus, although a triglyceride is described herein as being comprised of fatty acids, it should be understood that the fatty acid component does not necessarily contain a carboxylic acid hydrogen. If triglycerides are present, a majority of triglycerides present in the biocomponent feed can preferably be comprised of $C_{12}$ to $C_{18}$ fatty acid constituents, based on total triglyceride content. Other types of feed that are derived from biological raw material components can include fatty acid esters, such as fatty acid alkyl esters (e.g., FAME and/or FAEE).

Typically, the feed can include at least 0.1 wt % of feed based on a biocomponent source, or at least 0.5 wt %, or at least 1 wt %, or at least 3 wt %, or at least 10 wt %, or at least 15 wt %. Additionally or alternatively, the feed can include 35 wt % or less of a feed based on a biocomponent source, or 25 wt % or less, or 15 wt % or less. Optionally, the feedstock can include at least about 1% by weight of glycerides, lipids, fatty acids, fatty acid esters (such as fatty acid alkyl esters), or a combination thereof. The glycerides can include monoglycerides, diglycerides, or triglycerides. For example, the feedstock can include at least about 5 wt %, or at least about 10 wt %, or at least 20 wt % of glycerides, lipids, fatty acids, fatty acid esters, fatty acid alkyl esters, or a combination thereof. If the feedstock contains glycerides, lipids, or fatty acid compounds, the feedstock can include about 35 wt % or less, or about 25 wt % or less, or about 15 wt % or less, or about 10 wt % or less of glycerides, lipids, fatty acids, fatty acid esters, fatty acid alkyl esters, or a combination thereof. For example, the feedstock can include glycerides and/or fatty acid esters. Preferably, the feedstock can include triglycerides, fatty acid methyl esters, or a combination thereof.

In an embodiment, the biocomponent portion of the feedstock (such as the glycerides and/or fatty acid esters) can be a non-hydrotreated portion. A non-hydrotreated feed can typically have an olefin content and an oxygen content similar to the content of the corresponding raw biocomponent material. Examples of suitable biocomponent feeds can include food grade vegetable oils, and biocomponent feeds that are refined, bleached, and/or deodorized.

Biocomponent based diesel boiling range feedstreams can have a wide range of nitrogen and/or sulfur contents. For example, a biocomponent based feedstream based on a vegetable oil source can contain up to about 300 wppm nitrogen. In contrast, a biomass based feedstream containing whole or ruptured algae can sometimes include a higher nitrogen content. Depending on the type of algae, the nitrogen content of an algae based feedstream can be at least about 2 wt %, for example at least about 3 wt %, at least about 5 wt %, or at least about 10 wt %, and algae with still higher nitrogen contents are known. The sulfur content of a biocomponent feed can also vary. In some embodiments, the sulfur content can be about 500 wppm or less, for example about 100 wppm or less, about 50 wppm or less, or about 10 wppm or less.

Aside from nitrogen and sulfur, oxygen can be another heteroatom component in biocomponent based feeds. A biocomponent diesel boiling range feedstream based on a vegetable oil, prior to hydrotreatment, can include up to about 10 wt % oxygen, for example up to about 12 wt % or up to about 14 wt %. Additionally or alternately, such a biocomponent diesel boiling range feedstream can include at least about 1 wt % oxygen, for example at least about 2 wt %, at least about 3 wt %, at least about 4 wt %, at least about 5 wt %, at least about 6 wt %, or at least about 8 wt %. Further additionally or alternately, a biocomponent feedstream, prior to hydrotreatment, can include an olefin content of at least about 3 wt %, for example at least about 5 wt % or at least about 10 wt %.

A mineral feedstock refers to a conventional (e.g., non-biocomponent) feedstock, typically derived from crude oil and that has optionally been subjected to one or more separation and/or other refining processes. In one preferred embodiment, the mineral feedstock can be a petroleum feedstock boiling in the diesel range or above. Examples of suitable feedstocks can include, but are not limited to, virgin distillates, hydrotreated virgin distillates, kerosene, diesel boiling range feeds (such as hydrotreated diesel boiling range feeds), light cycle oils, atmospheric gas oils, and the like, and combinations thereof.

Mineral feedstocks for blending with a biocomponent feedstock can have a nitrogen content from about 50 wppm to about 2000 wppm nitrogen, for example from about 50 wppm to about 1500 wppm or from about 75 to about 1000 wppm. In some embodiments, the mineral feedstock can have a sulfur content from about 100 wppm to about 10,000 wppm sulfur, for example from about 200 wppm to about 5,000 wppm or from about 350 wppm to about 2,500 wppm. Additionally or alternately, the combined (biocomponent plus mineral) feedstock can have a sulfur content of at least about 5 wppm, for example at least about 10 wppm, at least about 25 wppm, at least about 100 wppm, at least about 500 wppm, or at least about 1000 wppm. Further additionally or alternately, the combined feedstock can have a sulfur content of about 2000 wppm or less, for example about 1000 wppm or less, about 500 wppm or less, about 100 wppm or less, or about 50 wppm or less. Still further additionally or alternately, the nitrogen content of the combined feedstock can be about 1000 wppm or less, for example about 500 wppm or less, about 100 wppm or less, about 50 wppm or less, about 30 wppm or less, about 20 wppm or less, or about 10 wppm or less.

The content of sulfur, nitrogen, oxygen, and olefins in a feedstock created by blending two or more feedstocks can typically be determined using a weighted average based on the blended feeds. For example, a mineral feed and a biocomponent feed can be blended in a ratio of 80 wt % mineral feed and 20 wt % biocomponent feed. If the mineral feed has a sulfur content of about 1000 wppm, and the biocomponent feed has a sulfur content of about 10 wppm, the resulting blended feed could be expected to have a sulfur content of about 802 wppm.

Diesel boiling range feedstreams suitable for use in the present invention tend to boil within the range of about 215° F. (about 102° C.) to about 800° F. (about 427° C.). Preferably, the diesel boiling range feedstream has an initial boiling point of at least about 215° F. (about 102° C.), for example at least about 250° F. (about 121° C.), at least about 275° F. (about 135° C.), at least about 300° F. (about 149° C.), at least about 325° F. (about 163° C.), at least about 350° F. (about 177° C.), at least about 400° F. (about 204° C.), or at least about 451° F. (about 233° C.). Preferably, the diesel boiling range feedstream has a final boiling point of about 800° F. (about 427° C.) or less, or about 775° F. (about 413° C.) or less, or about 750° F. (about 399° C.) or less. In some embodiments, the diesel boiling range feedstream can have a boiling range from about 451° F. (about 233° C.) to about 800° C. (about 427° C.). Additionally or alternately, the feedstock can be characterized by the boiling point required to boil a specified percentage of the feed. For example, the temperature required to boil at least 5 wt % of a feed is referred to as a "T5" boiling point. A suitable mineral (petroleum) feedstock can have a T5 boiling point of at least about 230° F. (about 110° C.), for example at least about 250° F. (about 121° C.) or at least about 275° F. (about 135° C.). Further additionally or alternately, the mineral (petroleum) feedstock can have a T95 boiling point of about 775° F. (about 418° C.) or less, for example about 750° F. (about 399° C.) or less or about 725° F. (about 385° C.) or less. In another embodiment, the diesel boiling range feedstream can also include kerosene range compounds to provide a feedstream with a boiling range from about 250° F. (about 121° C.) to about 800° F. (about 427° C.).

Reactions for Oxygen Removal

Oxygen removal during hydroprocessing of a feedstock typically occurs via one of three reaction pathways. One potential reaction pathway is hydrodeoxygenation. In a hydrodeoxygenation reaction, oxygen is removed from feed molecule as water. The carbon chain for the feed molecule remains intact after a typical hydrodeoxygenation reaction. Water is a contaminant that can potentially contribute to deactivation of some conventional hydrotreating catalysts, such as NiMo or CoMo type catalysts. However, by itself water does not lead to corrosion within a reaction system. Additionally, removing oxygen as water maintains the chain length of a feed molecule, Maintaining the chain length of molecules intended for use as a fuel or fuel blending product is usually beneficial, as it means that a greater percentage of the carbon from the feed is incorporated into the final fuel product.

Hydrodecarboxylation removes oxygen by forming $CO_2$ from biofeeds. This $CO_2$ forms carbonic acid when combined with water. Carbonic acid corrosion may require metallurgical upgrades to carbon steel in downstream equipment, particularly fin fans, heat exchangers, and other locations that liquid water will be present prior to a an amine scrubbing system or other system for removing $CO_2$.

Hydrodecarboxylation removes oxygen by forming $CO_2$ from biofeeds. CO is a known inhibitor for hydrodesulfurization. For example, 1000 ppm CO can deactivate a conventional CoMo catalyst by 10%. CO is also not removed in appreciable quantities by conventional amine scrubbing systems. As such, CO can build up through gas recycle and can be cascaded to downstream hydrotreatment, dewaxing, and/or hydrofinishing stages. As a result, removing oxygen from a biocomponent feed as CO may require the use of pressure swing adsorbers (including rapid cycle pressure swing adsorbers) or other gas cleaning equipment in order to remove CO from a reaction system.

Depending on the conditions present in a reactor, the relative amounts of CO and $CO_2$ in a reactor can be modified by the water gas shift reaction. The water gas shift reaction is an equilibrium reaction that can convert $CO_2$ and $H_2$ into CO and $H_2O$. Due to the water gas shift reaction, the amount of decarbonylation and decarboxylation may not be clear, due to conversion from one form of carbon oxide to another. Hydrodeoxygenation can be distinguished at least in part from decarbonylation and decarboxylation by characterizing the odd versus even numbered carbons in a deoxygenated product.

Because feeds derived from biological sources typically have carbon chains with even numbers of carbon molecules, hydrodeoxygenation can be distinguished from decarbonylation and decarboxylation based on the carbon chain length of the resulting molecules. Hydrodeoxygenation typically leads to production of molecules with an even number of carbon atoms while decarbonylation and decarboxylation lead to molecules with an odd number of carbon atoms.

Hydroprocessing Conditions—Deoxygenation

A catalyst suitable for oxygen removal during processing of a biocomponent portion of a feedstock can be a supported Group VI metal catalyst. The metal can be one or more Group VI metals (corresponding to Group 6 of the modern IUPAC periodic table) such as Mo or W. Preferably the Group VI metal is tungsten. The support for the catalyst can be any convenient type of support, such as alumina, silica, zirconia, titanic, amorphous carbon, or combinations thereof. In this document, a supported Group VI metal catalyst is defined as a catalyst that includes one or more Group VI metals on a support. A supported Group VI metal catalyst is further defined to exclude the presence of Group VIII metals as part of the catalyst. During catalyst synthesis, the one or more Group VI metals will typically be deposited or otherwise impregnated on the support as oxides. The oxides are typically converted to sulfides prior to use in a deoxygenation process. Thus, the definition herein of a Group VI metal catalyst includes catalysts where the Group VI metal is in either the oxide or the sulfide state on a support, unless otherwise specified. For convenience, a Group VI metal catalyst may also be referred to as a Group VI metal sulfide catalyst, as it is understood by those of skill in the art that the sulfide phase is the active metal phase. In this document, a supported catalyst that includes both Group VI metals and Group VIII non-noble metals will be explicitly referred to as including both Group VI and Group VIII metals.

A Group VI metal catalyst may further include another metal as a physical promoter. Examples of metals that act as physical promoters include alkaline earth metals (corresponding to Group 2 of the modern IUPAC periodic table) such as Mg and Group IIB transition metals (corresponding to Group 12 of the modern IUPAC periodic table) such as Zn. Thus, examples of Group VI metal catalysts with physical promoters are Group VI metal catalysts with Mo or W as a Group VI metal and Zn or Mg as a physical promoter metal. It is noted that both alkaline earth metals and Group IIB transition metals have the feature of no unpaired electrons in the highest occupied s-orbitals or highest occupied (if any) d-orbitals. Physical promoters are in contrast to metals that act as electronic promoters, such as Co or Ni. The Group VI metal catalysts described herein exclude the presence of electronic promoter metals, unless specifically identified as including such a metal. Examples of preferred physically promoted catalysts herein include catalysts containing ZnMo; ZnW; MgMo; and MgW. That is that the physically promoted catalyst can be a ZnMo containing catalyst, or alternatively, a ZnW containing catalyst, or alternatively, a MgMo containing catalyst, or alternatively, a MgW containing catalyst.

The amount of Group VI metal supported on a catalyst support can vary depending on the catalyst. Suitable amounts of metals range from about 1 wt % to about 30 wt % relative to the total weight of the catalyst. In some preferred embodiments, the amount of Group VI metal supported on the catalyst can be about 20 wt % or less, such as from about 1 wt % to about 15 wt %, preferably from about 6 wt % to about 12 wt %. The supported Group VI metal sulfide catalyst can also optionally include dopants and/or other metals different from Group VI or Group VIII transition metals. If the Group VI metal catalyst includes a physical promoter metal, the amount of physical promoter metal can be less than the amount of Group VI metal on the catalyst, such as about 5 wt % or less, or about 3 wt % or less.

Another option is to use a supported Group VI metal catalyst that consists essentially of one or more Group VI metals on a refractory support. Such a catalyst can include a Group VI metal on a support such as alumina, silica, titania, zirconia, amorphous carbon or a combination thereof. A catalyst that consists essentially of a Group VI metal on a support does not include more than incidental amounts of dopants, such as phosphorous, fluorine, or boron. A catalyst that consists essentially of a metal on a support also does not include more than incidental amounts of other types of transition metals as catalytic metals, such as Group V metals. However, as noted above, the support may contain transition metal oxides, such as oxides of titanium or zirconium.

Still another option is to use a physically promoted Group VI metal catalyst that consists essentially of one or more Group VI metals and one or more physical promoter metals on a refractory support. Such a catalyst can include a Group VI metal and a physical promoter metal on a support such as alumina, titania, zirconia, amorphous carbon, or a combination thereof. A catalyst that consists essentially of a Group VI metal and a physical promoter metal on a support does not include more than incidental amounts of dopants, such as phosphorous, fluorine, or boron. A catalyst that consists essentially of a Group VI metal and a physical promoter metal on a support also does not include more than incidental amounts of other types of transition metals or transition metal sulfides, such as Group V metal sulfides. However, as noted above, the support may contain transition metal oxides, such as oxides of titanium or zirconium.

The supported Group VI metal catalyst can be provided in a reactor in one or more catalyst beds. For example, a convenient bed length in some reactors is to have a bed length of about 25 feet to 30 feet. Such a bed length reduces difficulties in a catalyst bed associated with poor flow patterns. Due to the low reactivity of some Group VI metal catalysts, such as tungsten catalysts or physically promoted molybdenum catalysts, multiple beds may be preferable for achieving a desired level of deoxygenation.

Typical effective conditions for coprocessing a biocomponent feedstock with a mineral feedstock to remove oxygen can include conditions effective for hydrodeoxygenation, decarbonylation, and/or decarboxylation. In some embodiments, such as embodiments including a physically promoted Mo catalyst, the effective conditions can be selected to increase the selectivity for removing oxygen via hydrodeoxygenation rather than via decarbonylation or decarboxylation. A variety of conditions may be suitable as effective conditions. The pressure during processing of a feedstock for oxygen removal can correspond to a hydrogen partial pressure of about 400 psig (2.8 MPag) or less. At pressures of 400 psig or less, a Group VI metal catalyst (optionally with additional physical promoter metals) will perform little or no sulfur removal on a feed. Lower hydrogen partial pressures are also beneficial for reducing or minimizing the amount of olefin saturation, including the amount of saturation from propylene to propane that occurs during deoxygenation. However, the Group VI metal catalysts, optionally with additional physical promoter metals, are effective for oxygen removal at such hydrogen partial pressures. Depending on the nature of the feed, still lower pressures may be suitable for deoxygenation, such as a total pressure of about 300 psig (2.1 MPag) with a hydrogen partial pressure of about 200 psig (1.4 MPag) or less. Alternatively, higher partial pressures of hydrogen can also be used, such as a hydrogen partial pressure of between about 200 psig (1.4 MPag) to about 2000 psig (14 MPag), such as from about 400 psig (2.8 MPag) to about 1000 psig (6.9 MPag). Higher hydrogen partial pressures can be effective for maintaining a given deoxygenation activity while increasing the throughput of a reactor. However, higher hydrogen partial pressures may reduce the selectivity of the catalyst for performing deoxygenation versus olefin saturation.

The effective conditions for oxygen removal can also include a temperature, a hydrogen treat gas rate, and a liquid hourly space velocity (LHSV). Suitable effective temperatures can be from about 230° C. to about 375° C., such as at least about 250° C. or less than about 350° C. The LHSV can be from about 0.1 $hr^{-1}$ to about 10 $hr^{-1}$, such as from about 0.2 $hr^{-1}$ to about 5.0 $hr^{-1}$. The hydrogen treat gas rate can be any convenient value that provides sufficient hydrogen for deoxygenation of a feedstock. Typical values can range from about 500 scf/B (84 $Nm^3/m$) to about 10,000 scf/B (1685 $Nm^3/m^3$). One option for selecting a treat gas rate can be to select a rate based on the expected stoichiometric amount of hydrogen for complete deoxygenation of the feedstock. For example, many types of biocomponent feeds have a stoichiometric hydrogen need for deoxygenation of between 200 scf/B (34 $Nm^3/m^3$) to about 1500 scf/B (253 $Nm^3/m^3$), depending on the mechanism for oxygen removal. The hydrogen treat gas rate can be selected based on a multiple of the stoichiometric hydrogen need, such as at least about 1 times the hydrogen need, or at least about 1.5 times the hydrogen need, or at least about 2 times the hydrogen need.

The effective conditions for deoxygenation can be suitable for reducing the oxygen content of the feed to less than about 1.0 wt %, such as less than about 0.5 wt % or less than about 0.2 wt %. Although the stoichiometric hydrogen need is calculated based on complete deoxygenation, reducing the oxygen content to substantially zero is typically not required to allow further processing of the deoxygenated feed in conventional equipment. Alternatively, in some aspects the effective conditions can be selected to perform at least a partial deoxygenation of the feedstock. A partial deoxygenation corresponds to conditions suitable for reducing the oxygen content of the feed by at least about 40%, such as by at least about 50% or at least about 75%.

Hydroprocessing Conditions—Hydrotreatment

After at least partial deoxygenation, the mixture of mineral and biocomponent feed can be hydrotreated in one or more reaction stages. A reaction stage can correspond to one or more catalyst beds. Optionally, the deoxygenation catalyst and the hydrotreatment catalyst can be included in a single stage, such as in a single reactor.

Reaction conditions in a hydrotreatment stage can be effective conditions suitable for reducing the sulfur content of the feedstream. The reaction conditions can include an LHSV of 0.3 to 5.0 hr$^{-1}$, a total pressure from about 200 psig 1.4 MPa) to about 3000 psig (20.7 MPa), a treat gas containing at least about 80% hydrogen (remainder inert gas) with a hydrogen treat gas rate of about 500 scf/bbl (84 m$^3$/m$^3$) to about 10000 scf/bbl (1685 m$^3$/m$^3$), and a temperature of from about 500° F. (260° C.) to about 800° F. (427° C.). Preferably, the reaction conditions include an LHSV of from about 0.5 to about 1.5 hr$^{-1}$, a total pressure from about 1400 psig (9.7 MPa) to about 2000 psig (13.8 MPa), and a temperature of from about 700° F. (371° C.) to about 750° F. (399° C.).

Optionally, the hydrotreatment stage(s) can be operated at a pressure below about 700 psig (4.8 MPa), or below about 800 psig (5.5 MPa). For example, the pressure in a stage in the hydrotreatment reactor can be at least about 300 psig (2.1 MPa), or at least about 350 psig (2.4 MPa), or at least about 400 psig (2.8 MPa), or at least about 450 psig (3.1 MPa). The pressure in a stage in the hydrotreatment reactor can be about 700 psig (4.8 MPa) or less, or about 650 psig (4.5 MPa) or less, or about 600 psig (4.1 MPa) or less. Optionally, the hydrotreatment reactor can also include one or more other types of stages or beds, such as hydrocracking or hydrofinishing beds.

The catalyst in a hydrotreatment stage can be a conventional hydrotreating catalyst, such as a catalyst composed of a Group NIB metal and/or a Group VIII metal on a support. Suitable metals include cobalt, nickel, molybdenum, tungsten, or combinations thereof. Preferred combinations of metals include nickel and molybdenum or nickel, cobalt, and molybdenum. Suitable supports include silica, silica-alumina, alumina, and titania. The amount of Group VI metal supported on the catalyst support can vary depending on the catalyst. Suitable total amounts of metals range from about 1 wt % to about 35 wt % relative to the total weight of the catalyst.

The hydrotreating conditions can be selected to reduce the sulfur and/or the nitrogen content of the feed to a desired level. One option is to hydrotreat the feed under conditions effective to reduce the sulfur to less than about 100 wppm, or less than about 50 wppm, or less than about 15 wppm, or less than about 10 wppm. The amount of sulfur remaining can be dependent on the desired standard for the country of use. The amount of nitrogen can similarly be reduced to about 15 wpm or less, or about 10 wppm or less, or about 1 wppm or less.

Examples of Processing Configurations

Figure 1:
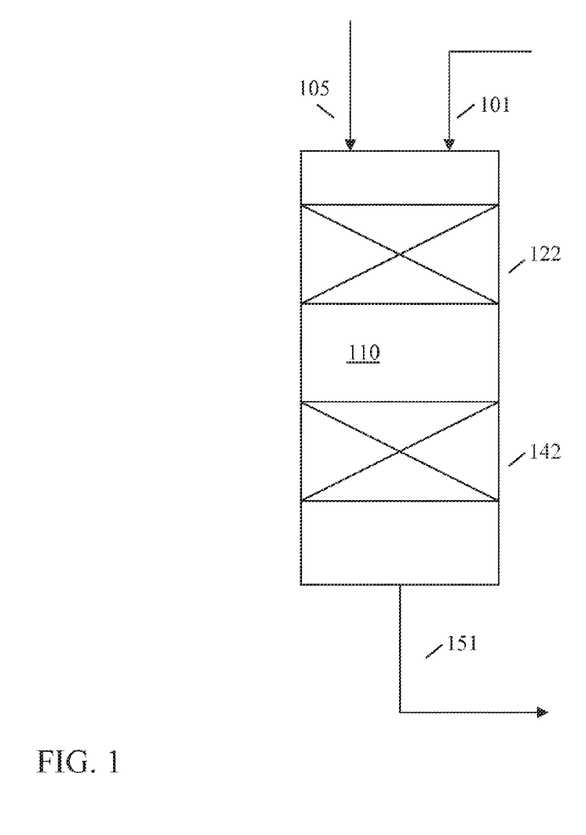
FIG. 1 schematically shows a reaction system suitable for performing a process according to an embodiment of the invention.

FIG. 1 schematically shows an example of a processing configuration suitable for use according to the invention. In FIG. 1, a reactor 110 is shown that includes two catalyst beds. A first catalyst bed 122 corresponds to a Group VI metal catalyst, such as Mo or W, optionally with physical promoter metals such as Zn or Mg, such physically promoted Group VI metal catalysts as ZnMo, or MgMo, or ZnW, or MgW. The second catalyst bed 142 corresponds to a conventional hydrotreatment catalyst. A mixture 105 of a biocomponent feed and a mineral feed can be introduced into the reactor 110 along with a hydrogen-containing stream 101. The mixture can be deoxygenated and desulfurized under effective conditions, including a pressure of 400 psig (2.8 MPag) or less for both the deoxygenation and the desulfurization. The configuration in FIG. 1 shows only one bed of each type of catalyst, but additional beds of one or both catalysts can also be used. The resulting deoxygenated and desulfurized effluent 151 can be used in any convenient manner, such as by adding the effluent to the diesel pool or subjecting the effluent to further processing. As an alternative, a configuration similar to FIG. 1 can be constructed by placing first catalyst bed 122 and second catalyst bed 142 in separate reactors and cascading the effluent from first catalyst bed 122 into the reactor containing second catalyst bed 142.

Figure 2:
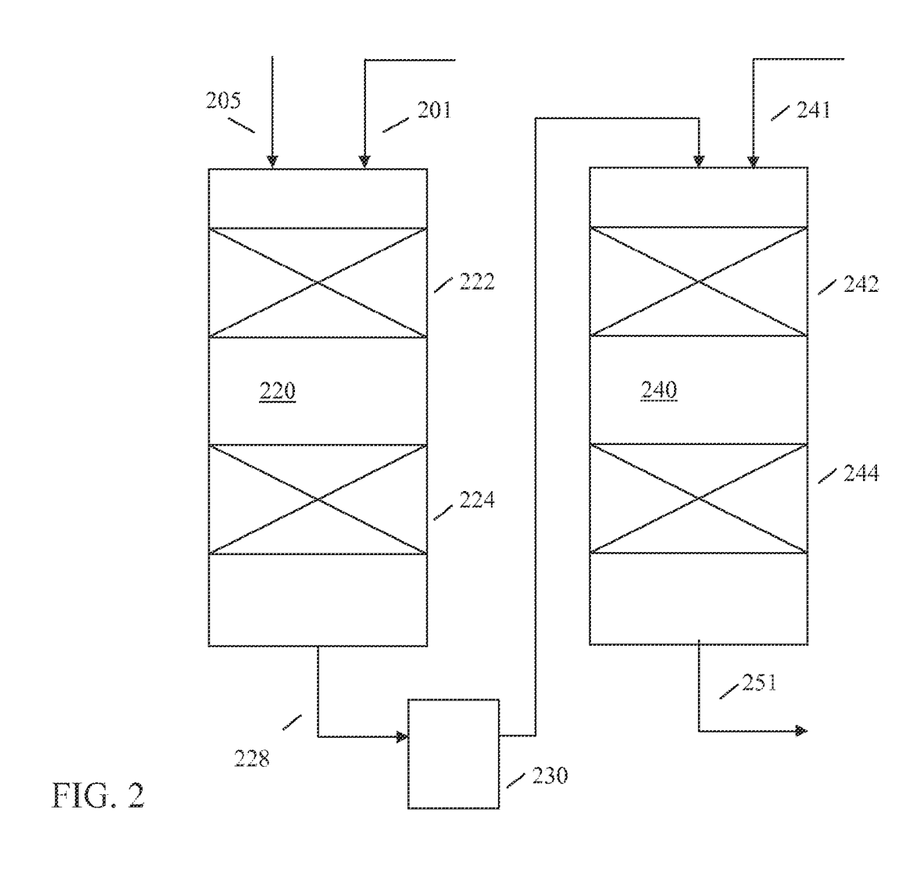
FIG. 2 depicts a reaction system suitable for performing a process according to an embodiment of the invention.

FIG. 2 schematically shows an example of another processing configuration. In FIG. 2, catalyst beds 222 and 224 are located in a first reactor 220. Catalyst beds 222 and 224 in FIG. 2 corresponds to beds of a Group VI metal catalyst, or optionally a physically promoted Group VI metal catalyst, as described in embodiments herein. Optionally, a single catalyst bed could be used in reactor 220, or more than two catalyst beds could be used. A mixture 205 of biocomponent feed and mineral feed can be coprocessed in reactor 220 in the presence of a hydrogen-containing stream 201. The effluent 228 from the reactor 220 containing the deoxygenation stage(s) can then be passed through a separation stage 230. The separation stage 230 can include one or more separators. The separation stage can include, for example, a hot gas-liquid separator to remove at least a majority of the water and carbon oxides present in the effluent. The remaining liquid phase effluent can then be passed into reactor 240 for hydrotreatment to reduce the amount of sulfur in the feed. The feed is hydrotreated in the presence of the catalyst in beds 242 and 244 and in the presence of a hydrogen-containing stream 241. The resulting deoxygenated and desulfurized effluent 251 can be used in any convenient manner, such as by adding the effluent to the diesel pool or subjecting the effluent to further processing. Optionally, a single catalyst bed could be used in reactor 240, or more than two catalyst beds could be used. Optionally, one of the catalyst beds in reactor 240 can correspond to a hydrocracking or hydrofinishing catalyst.

Example of Deoxygenating Biocomponent Feed with a Single Metal Catalyst

A series of catalysts and conditions were tested in parallel in a multiple catalyst testing apparatus. The test rig included a plurality of reaction vessels contained in an apparatus with an isothermal reaction zone. Each reaction vessel was loaded with either 1.0 cc or 1.5 cc of catalyst, as will be described below. The catalysts were sulfided by exposing the catalysts to a feed spiked with dimethyl disulfide (DMDS) and held at a temperature of at least 450° F. for an extended period of time. Spiking with DMDS resulted in increasing the sulfur concentration from 1.37 wt % to 2.6 wt % of the sulfiding feed. The sulfiding feed had a T10 boiling point of 427° F. and a final boiling point of 777° F. The flow rate of the spiked feed in each reactor during sulfidation was 1.5 cc per hour.

The data presented below includes experiments for metal sulfide catalysts corresponding to a molybdenum sulfide catalyst and a tungsten sulfide catalyst. A commercially available supported CoMo catalyst was also tested for comparison. The molybdenum catalyst initially included about 20 wt % of molybdenum oxide on an alumina support. The molybdenum was converted to sulfide form using the procedure described above. The tungsten catalyst initially included about 20 wt % of tungsten oxide on a silica support prior to sulfidation. The commercially available CoMo catalyst included 20 wt % molybdenum oxide and about 5 wt % cobalt oxide on a silica support prior to sulfidation. The experiments included 4 sets of catalyst conditions. A first reaction vessel contained 1.0 cm$^3$ of the molybdenum catalyst. A second reaction vessel contained 1.0 cm³ of the tungsten catalyst. A third reaction vessel contained 1.5 cm³ of the tungsten catalyst. A fourth reaction vessel contained 1.5 cm³ of the commercially available CoMo catalyst.

After sulfidation, the sulfided catalysts were used to treat a feed composed of soybean oil and dodecane as a diluent. The soybean oil had an oxygen content of 11.0 wt %. Table 1 shows the reaction conditions that were studied.

TABLE 1

Reaction Conditions

| Condition | Temperature (° F.) | Pressure (psig) | Feed Bio Content (wt % bio) | Liquid Feed Rate (cc hr⁻¹) |
|---|---|---|---|---|
| 1 | 500 | 400 | 30 | 1.5 |
| 2 | 575 | 400 | 30 | 1.5 |
| 3 | 650 | 400 | 30 | 1.5 |
| 4 | 550 | 400 | 50 | 1.5 |
| 5 | 550 | 1800 | 50 | 1.5 |
| 6 | 475 | 1800 | 50 | 1.5 |
| 7 | 600 | 1800 | 50 | 1.5 |
| 8 | 600 | 1800 | 30 | 2.6 |
| 9 | 550 | 1800 | 30 | 2.6 |
| 10 | 575 | 400 | 30 | 1.5 |

Using the parallel experimental apparatus, each of the four catalyst configurations was tested at each of the ten conditions in Table 1. In addition to the above, at conditions 1-4 the feed included a spiking agent to produce a sulfur level of 500 wppm. The amount of spiking agent was increased to produce a sulfur level of 1 wt % for conditions 5-10. In the following figures, each of the conditions is indicated in the horizontal axis direction by the numbers 1-10 near the top of the graph. Each change in condition is also shown by a dotted dividing line.

As an initial characteristic, the amount of deoxygenation that occurred for each catalyst at each condition was determined. One method for determining the deoxygenation would be to do a total mass balance of all oxygen-containing species in the feed and the products. However, this was not practical to perform on a daily basis, so instead the amount of conversion of molecules from above 322° C. to below 322° C. was measured. For the soybean oil feed used in the experiments, molecules boiling above 322° C. correspond to molecules having greater than 18 carbon atoms, while any deoxygenated products will have 18 carbon atoms or less.

Figure 6:
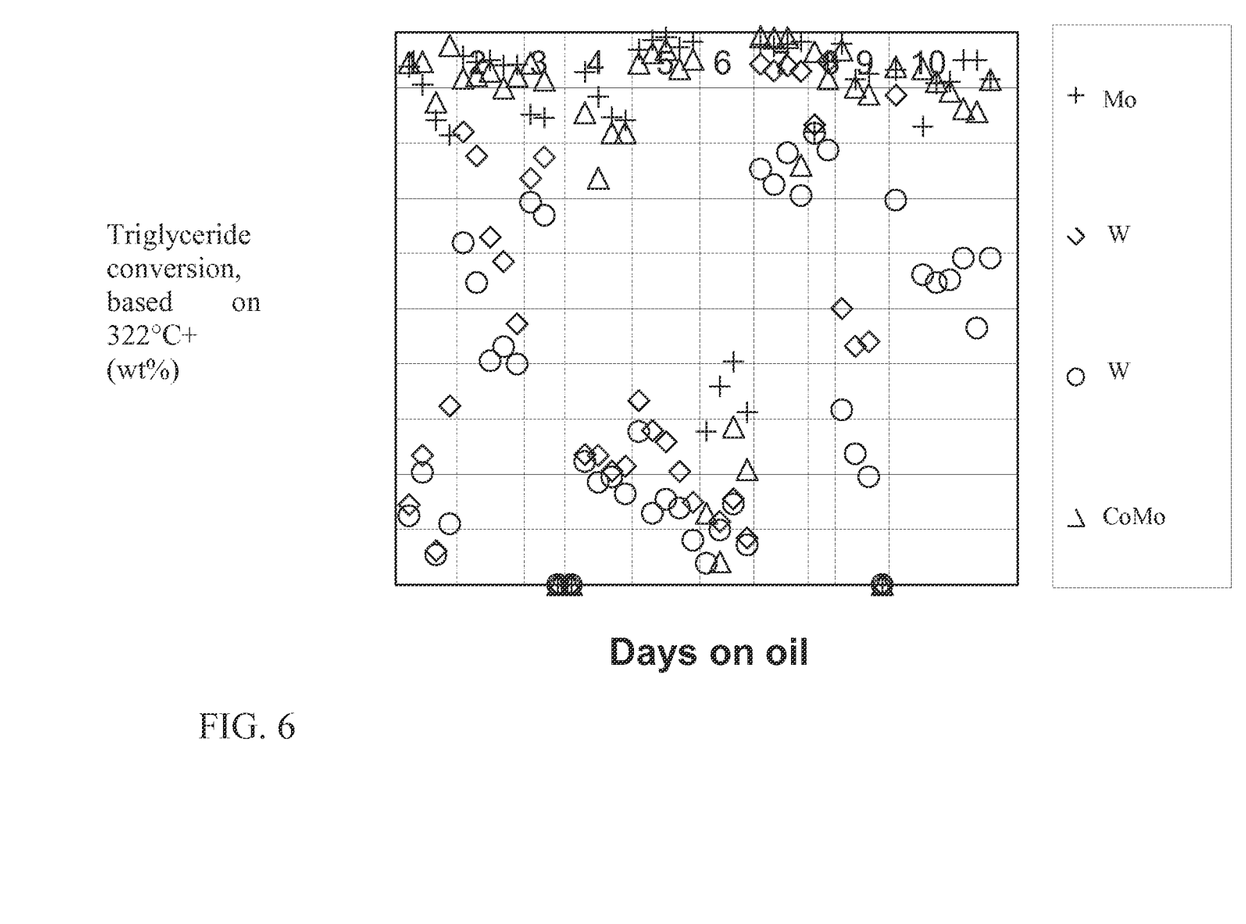

FIG. 6 shows the amount of conversion relative to 322° C. for the molybdenum, tungsten, and CoMo catalysts. At both 400 psig (2.76 MPag) and 1800 psig (12.4 MPag), the molybdenum catalyst produced deoxygenation levels of at least 98% while the CoMo catalyst resulted in at least 99% deoxygenation. The tungsten catalysts produced lower amounts of deoxygenation under test condition 2 of either about 30% deoxygenation (1.0 cm³) or about 50% deoxygenation (1.5 cm³). This indicates the lower space velocities (more catalyst per liquid feed volume) may be needed for the tungsten catalyst as compared to the molybdenum catalyst to achieve similar levels of deoxygenation of a feed. More generally, however. FIG. 6 demonstrates that the Group VI metal catalysts are effective for deoxygenation of a biocomponent feed.

In addition to characterizing the oxygen conversion, the amount of CO, $CO_2$, and $H_2O$ generated by each catalyst was also characterized. For CO and $CO_2$, the amount of carbon oxide generated can be characterized relative to the maximum possible yield based on the biocomponent source. For the soybean oil feed used as the biocomponent source, if all of the oxygen is removed by decarbonylation, the yield of CO would be 9.6 wt % relative to the weight of the soybean oil. If all of the oxygen is removed by decarboxylation, the yield of $CO_2$ would be 15.1 wt %.

Figure 3:
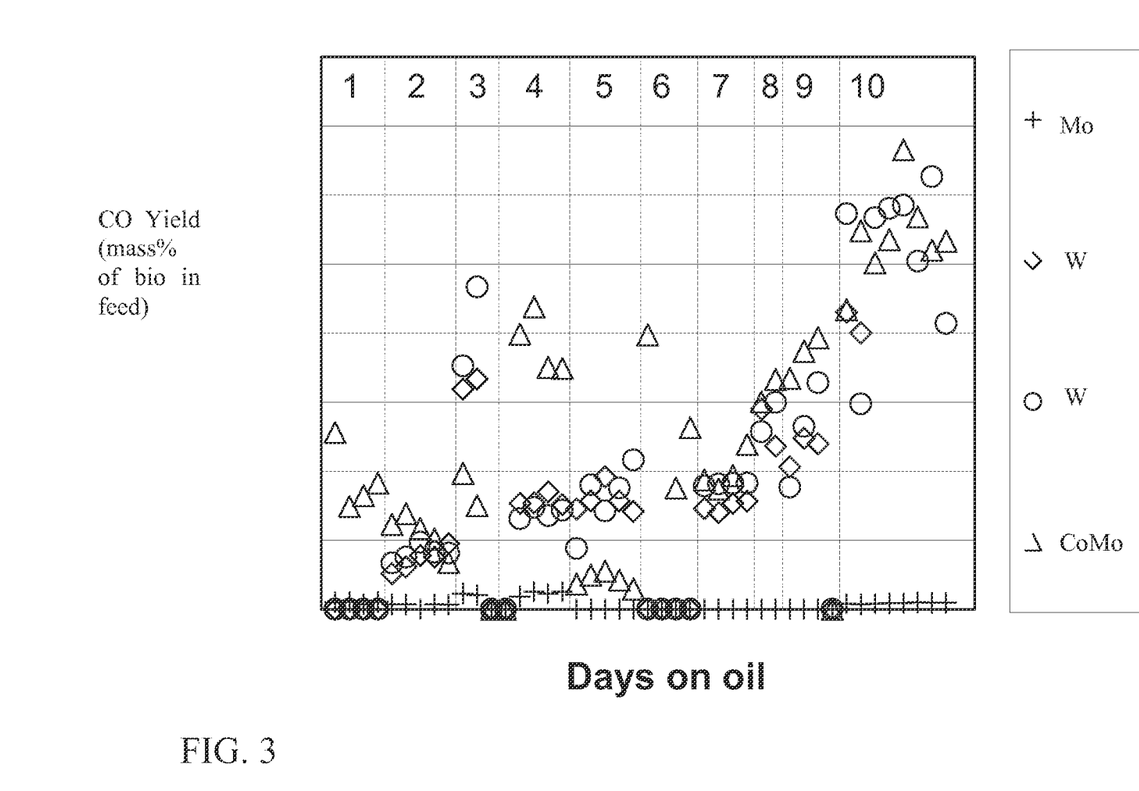
FIGS. 3 to 6 show analysis plots from experiments performed according to an embodiment of the invention as associated testing is further described in the Examples herein.

FIG. 3 shows the CO yield for each of the catalysts tested at each of the ten conditions. As shown in FIG. 3, the catalyst containing Mo had the lowest production of CO, as almost no CO was detected in the output effluent from the reactor. The tungsten catalyst and CoMo catalyst produced somewhat higher amounts of CO.

Figure 4:
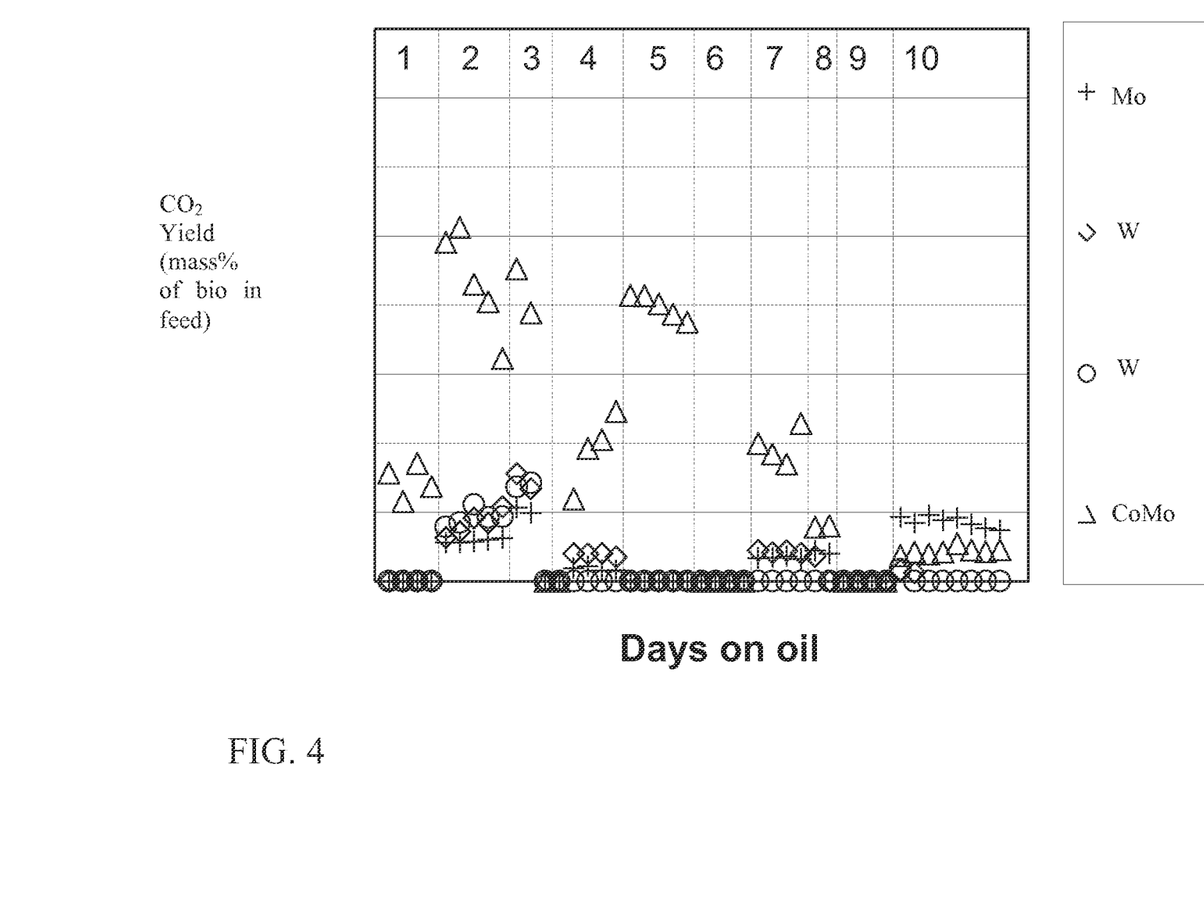

FIG. 4 shows the $CO_2$ for each of the catalysts under the ten conditions. As shown in FIG. 4, none of the conditions resulted in substantial amounts of $CO_2$. Part of the reason for this could be due to conversion of $CO_2$ into (X) via a water gas shift reaction.

Figure 5:
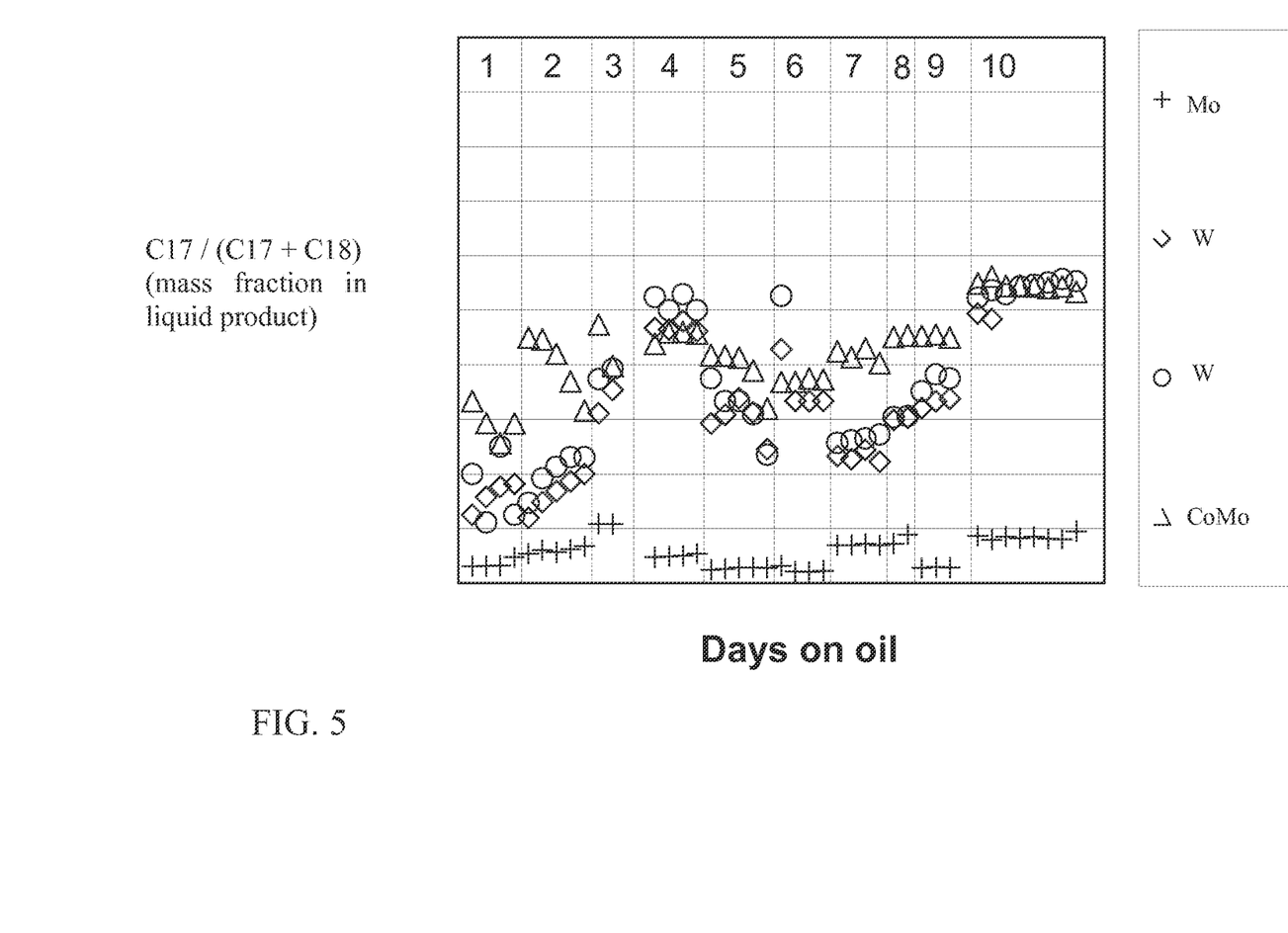

FIG. 5 shows the selectivity of the catalysts at each condition for removing oxygen via hydrodeoxygenation versus decarbonylation and decarboxylation. In FIG. 5, the amount of $C_{17}$; versus $C_{17}+C_{18}$ molecules in the effluent was used as a measure of whether oxygen was removed with or without carbon removal. As shown in FIG. 5, the $MoS_2$ catalyst removed only about 10% of the oxygen atoms in the form of CO or $CO_2$. This suggests that the amount of CO generated using a $MoS_2$ catalyst might be low enough to avoid the need for specialized corrosion-resistant equipment when coprocessing biocomponent feeds. The tungsten sulfide catalyst and the CoMo catalyst showed a roughly even split between $C_{17}$ and $C_{18}$ compounds.

In addition to the above experiments, an additional set of process runs was performed using metal sulfide catalysts physically promoted with Mg or Zn (in their oxide forms, MgO or ZnO). In these additional experiments, three types of catalyst were investigated. One catalyst included 3.0 wt % of ZnO and 10.6 wt % of $MoO_3$ on an alumina support. A second catalyst included 3.0 wt % of MgO and 21.4 wt % of $MoO_3$ on an alumina support. A third catalyst included ZnO and $MoO_3$ in a 1.5 to 1 ratio on an alumina support. The catalysts were used for deoxygenation of a triglyceride-containing feed that included about 50 wt % each of canola oil and dodecane. The reaction conditions included a hydrogen partial pressure of 400 psig (2.76 MPag), an LHSV of 1 hr⁻¹, and a hydrogen treat gas rate of about 2000 scf/bbl (337 Nm³/m³). The reaction temperature was either 275° C. or 295° C. The deoxygenation activity of the physically promoted catalysts was similar to or possibly slightly greater than the activity for a corresponding molybdenum catalyst without a physical promoter. By contrast, the catalyst containing a larger amount of physical promoter ZnO relative to the $MoO_3$ was relatively low in deoxygenation activity at the investigated deoxygenation conditions.

Figure 7:
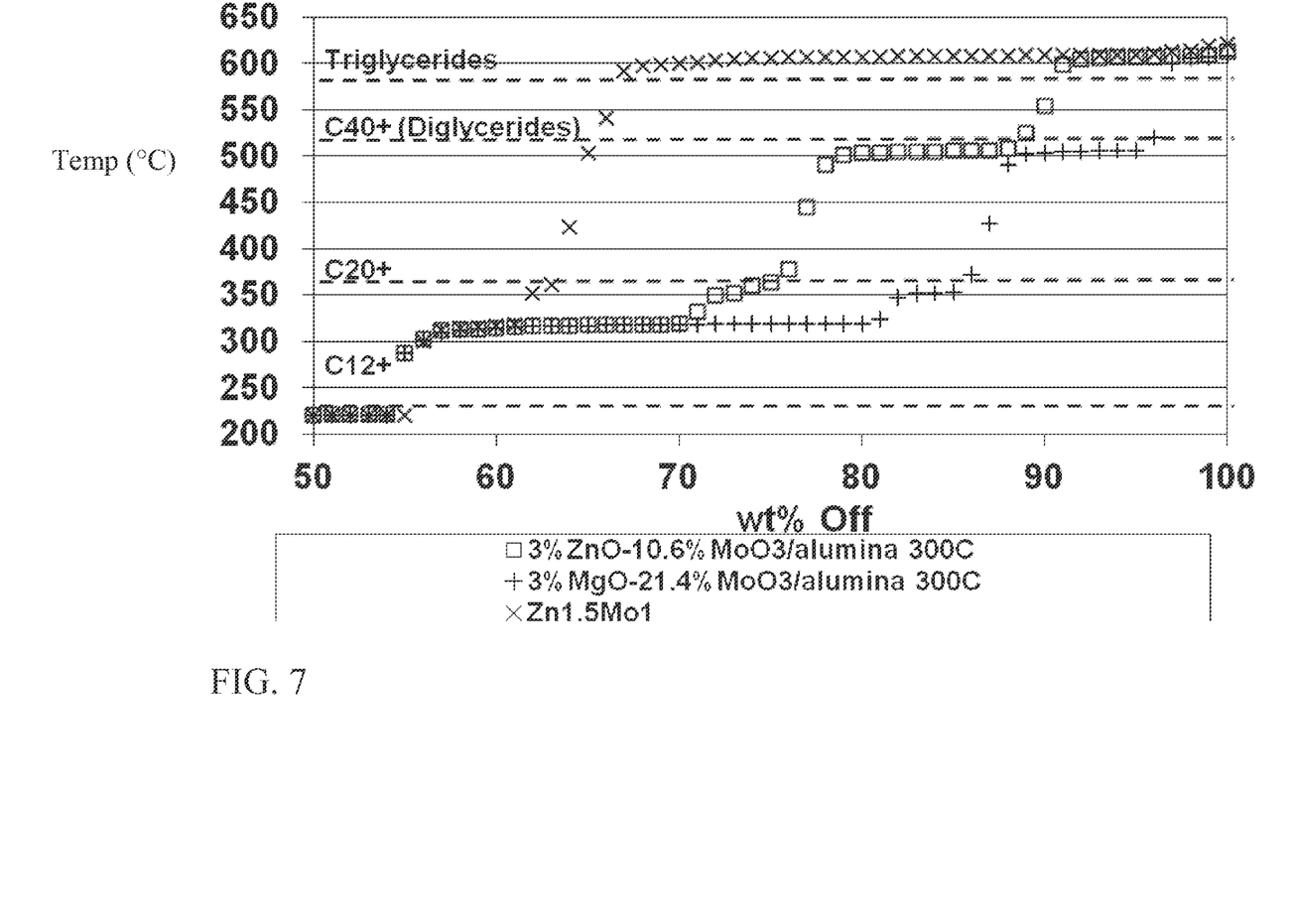
FIGS. 7 and 8 show simulated distillations of products obtained from bio-based feeds processed using physically promoted catalysts according to an embodiment of the invention.
Figure 8:
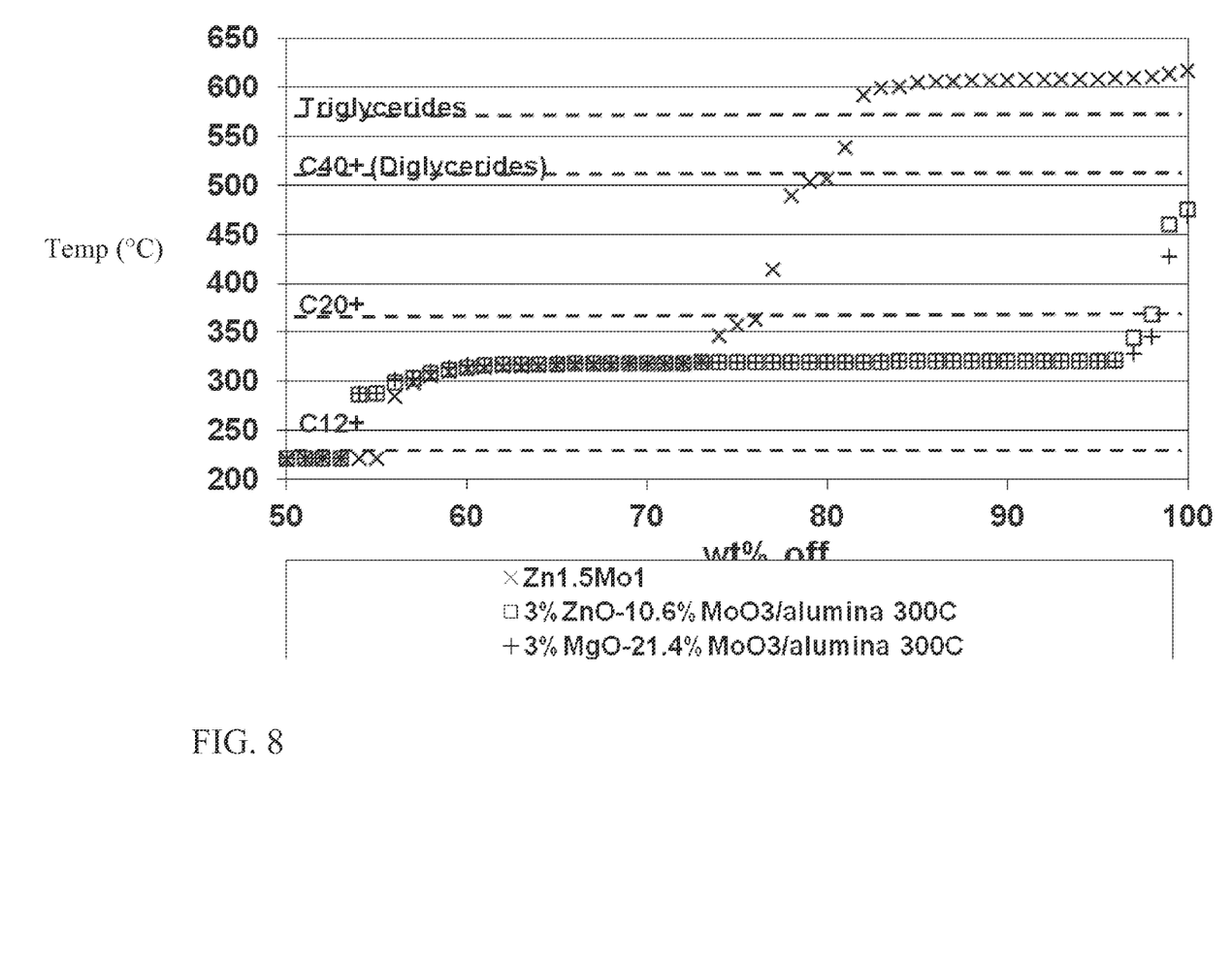

FIG. 7 shows a simulated distillation profile of the deoxygenated products from processing of the canola oil feed at 275° C. As shown in FIG. 7, both of the physically promoted catalysts are effective for deoxygenation of the canola oil feed. Due to the lower metal concentration, the catalyst containing 3.0 wt % ZnO and 10.6 wt % of $MoO_3$ only provided a partial deoxygenation of the feed. However, as shown in FIG. 8, increasing the reaction temperature to 295° C. resulted in effectively a complete deoxygenation of the canola oil feed. As a comparison, the catalyst formulated with a larger amount of ZnO relative to $MoO_3$ is not capable of effectively deoxygenating the canola oil feed even at the higher temperature.

ADDITIONAL EMBODIMENTS

Embodiment 1

A method for coprocessing of a biocomponent feedstock, comprising: exposing a feedstock containing a mineral fraction and a biocomponent fraction to a supported Group VI metal catalyst in the presence of hydrogen under effective deoxygenation conditions for forming a deoxygenated effluent, the Group VI metal catalyst comprising tungsten, physically promoted tungsten, or physically promoted molybdenum on a support, the feedstock comprising 25 wt % or less of the biocomponent fraction; and exposing the deoxygenated feed to a hydroprocessing catalyst under effective hydroprocessing conditions to produce an effluent having a sulfur content of about 100 wppm or less.

Embodiment 2

The method of Embodiment 1, wherein the supported Group VI metal catalyst comprises physically promoted molybdenum, the physical promoter metal being Zn or Mg.

Embodiment 3

The method of any of the above embodiments, wherein the amount of physical promoter metal is less than the amount of Group VI metal supported on the catalyst, preferably 3.0 wt % or less.

Embodiment 4

The method of Embodiment 3, the physical promoter metal is zinc, magnesium, or a combination thereof.

Embodiment 5

The method of any of Embodiments 1 to 4, wherein the supported Group VI metal catalyst comprises tungsten.

Embodiment 6

The method of any of Embodiments 1 to 4, wherein the supported Group VI metal catalyst comprises zinc and molybdenum.

Embodiment 7

The method of any of Embodiments 1 to 4, wherein the supported Group VI metal catalyst comprises zinc and tungsten.

Embodiment 8

The method of any of Embodiments 1 to 4, wherein the supported Group VI metal catalyst comprises magnesium and molybdenum.

Embodiment 9

The method of any of Embodiments 1 to 4, wherein the supported Group VI metal catalyst comprises magnesium and tungsten.

Embodiment 10

The method of any of the above embodiments, wherein the effective deoxygenation conditions include a temperature from about 250° C. to about 350° C., an LHSV of from about 0.2 $hr^{-1}$ to about $hr^{-1}$, and a hydrogen partial pressure of about 200 psig (1.4 MPag) to about 2000 psig (14 MPag).

Embodiment 11

The method of any of the above embodiments, wherein the effective deoxygenation conditions comprise a hydrogen partial pressure of 400 psig (2.8 MPag) or less, preferably 300 psig (2.1 MPag) or less.

Embodiment 12

The method of any of Embodiments 1 to 10, wherein the effective deoxygenation conditions comprise a hydrogen partial pressure of 300 psig (2.1 MPag) to 600 psig (4.2 MPag).

Embodiment 13

The method of any of the above embodiments, wherein the supported Group VI metal catalyst and the hydroprocessing catalyst form a stacked bed of catalysts.

Embodiment 14

The method of any of the above embodiments, wherein the deoxygenated effluent has an oxygen content of about 1.0 wt % or less, preferably about 0.5 wt % or less.

Embodiment 15

The method of any of the above embodiments, wherein the supported Group VI metal catalyst consists essentially of tungsten, physically promoted tungsten, or physically promoted molybdenum on a support.

Embodiment 16

The method of Embodiment 15, wherein the supported Group VI metal catalyst consists essentially of physically promoted molybdenum, the physical promoter metal being Zn or Mg.

Embodiment 17

The method of any of the above embodiments, wherein the support comprises alumina, silica, titania, zirconia, amorphous carbon, or a combination thereof.

Embodiment 18

The method of any of the above embodiments, further comprising separating the deoxygenated effluent to form a gas phase effluent and a liquid phase effluent, wherein exposing at least a portion of the deoxygenated effluent to a hydroprocessing catalyst comprises exposing the liquid phase effluent to the hydroprocessing catalyst.

Embodiment 19

The method of any of the above embodiments, wherein the effective hydroprocessing conditions include an LHSV of 0.3 to 5.0 $hr^{-1}$, a total pressure from about 200 psig (1.4 MPa) to about 3000 psig (20.7 MPa), a treat gas containing at least about 80% hydrogen (remainder inert gas) with a hydrogen treat gas rate of about 500 scf/bbl (84 $m^3/m^3$) to about 10000 scf/bbl (1685 $m^3/m^3$), and a temperature of from about 500° F. (260° C.) to about 800° F. (427° C.); and preferably, the hydroprocessing conditions include an LHSV of from about 0.5 to about 1.5 hr$^{-1}$, a total pressure from about 1400 psig (9.7 MPa) to about 2000 psig (13.8 MPa), and a temperature of from about 700° F. (371° C.) to about 750° F. (399° C.).

Embodiment 20

The method of any of the above embodiments, wherein the hydroprocessing catalyst is a supported CoMo hydrotreating catalyst.

Embodiment 21

The method of any of the above embodiments, wherein the hydroprocessing catalyst is a supported NiMo hydrotreating catalyst.

Embodiment 22

The method of any of the above embodiments, wherein the hydroprocessing catalyst is a supported NiW hydrotreating catalyst.

What is claimed is:

1. A method for coprocessing of a biocomponent feedstock, comprising:
    exposing a feedstock containing a mineral fraction and a biocomponent fraction to a supported Group VI metal catalyst in the presence of hydrogen under effective deoxygenation conditions for forming a deoxygenated effluent, the Group VI metal catalyst comprising tungsten or molybdenum with a physical promoter metal on a support, but excluding electronic promoter metals, wherein the excluded electronic promoter metals comprise Group VIII metals, the feedstock comprising 25 wt % or less of the biocomponent fraction; and
    exposing at least a portion of the deoxygenated effluent to a hydroprocessing catalyst under effective hydroprocessing conditions to produce an effluent having a sulfur content of about 100 wppm or less.

2. The method of claim 1, wherein the supported Group VI metal catalyst comprises physically promoted molybdenum, the physical promoter metal being Zn or Mg.

3. The method of claim 1, wherein the amount of physical promoter metal is less than the amount of Group VI metal contained in the supported Group VI metal catalyst.

4. The method of claim 1, wherein the effective deoxygenation conditions include a temperature from about 250° C. to about 350° C., an LHSV of from about 0.2 hr$^{-1}$ to about 10 hr$^{-1}$, and a hydrogen partial pressure of about 200 psig (1.4 MPag) to about 2000 psig (14 MPag).

5. The method of claim 4, wherein the effective deoxygenation conditions include a hydrogen partial pressure of 300 psig (2.1 MPag) to 600 psig (4.2 MPag).

6. The method of claim 1, wherein the effective deoxygenation conditions comprise a hydrogen partial pressure of 400 psig (2.8 MPag) or less.

7. The method of claim 1, wherein the supported Group VI metal catalyst and the hydroprocessing catalyst form a stacked bed of catalysts.

8. The method of claim 1, wherein the deoxygenated effluent has an oxygen content of about 0.5 wt % or less.

9. The method of claim 1, wherein the supported Group VI metal catalyst comprises zinc and molybdenum.

10. The method of claim 1, wherein the supported Group VI metal catalyst comprises zinc and tungsten.

11. The method of claim 1, wherein the supported Group VI metal catalyst comprises magnesium and molybdenum.

12. The method of claim 1, wherein the supported Group VI metal catalyst comprises magnesium and tungsten.

13. The method of claim 1, wherein the supported Group VI metal catalyst consists essentially of tungsten with a physical promoter metal or molybdenum with a physical promoter metal on a support.

14. The method of claim 13, wherein the supported Group VI metal catalyst consists essentially of physically promoted molybdenum, the physical promoter metal being Zn or Mg.

15. The method of claim 1, wherein the support comprises alumina, silica, titania, zirconia, amorphous carbon, or a combination thereof.

16. The method of claim 1, further comprising separating the deoxygenated effluent to form a gas phase effluent and a liquid phase effluent, wherein the exposing at least a portion of the deoxygenated effluent to a hydroprocessing catalyst comprises exposing the liquid phase effluent to the hydroprocessing catalyst.

17. The method of claim 1, wherein the effective hydroprocessing conditions include an LHSV of 0.3 to 5.0 hr$^{-1}$, a total pressure from about 200 psig (1.4 MPa) to about 3000 psig (20.7 MPa), a treat gas containing at least about 80% hydrogen (remainder inert gas) with a hydrogen treat gas rate of about 500 scf/bbl (84 m$^3$/m$^3$) to about 10000 scf/bbl (1685 m$^3$/m$^3$), and a temperature of from about 500° F. (260° C.) to about 800° F. (427° C.).

18. The method of claim 17, wherein the hydroprocessing catalyst is a supported CoMo hydrotreating catalyst.

19. The method of claim 17, wherein the hydroprocessing catalyst is a supported NiMo hydrotreating catalyst.

20. The method of claim 17, wherein the hydroprocessing catalyst is a supported NiW hydrotreating catalyst.

* * * * *